(No Model.) 2 Sheets—Sheet 1.

G. L. WHITING.
CULTIVATOR.

No. 518,683. Patented Apr. 24, 1894.

Witnesses

Inventor
Geo. L. Whiting
By Attorney Story B. Ladd (No Model.) 2 Sheets—Sheet 2.
G. L. WHITING.
CULTIVATOR.
No. 518,683. Patented Apr. 24, 1894.
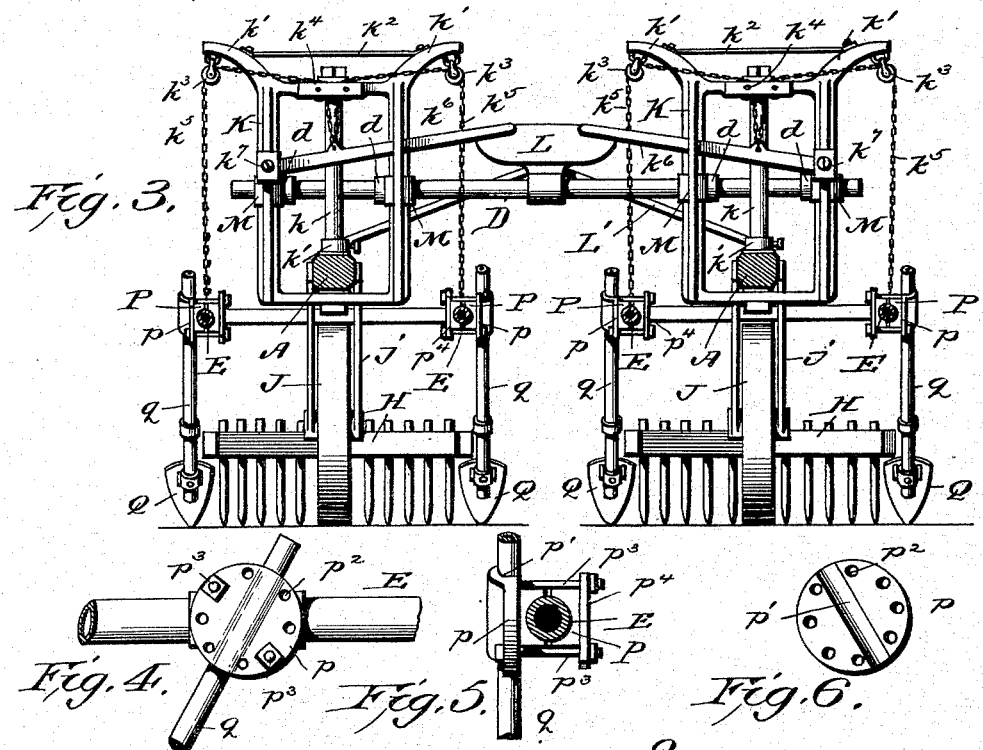
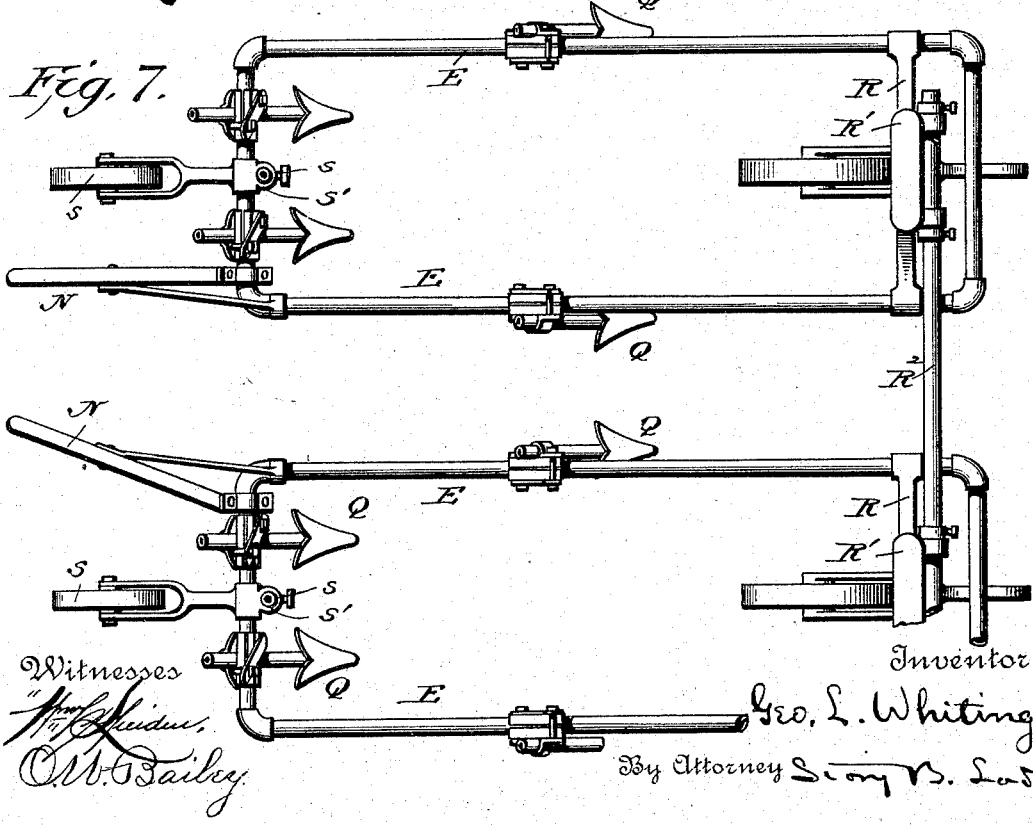
Witnesses
Inventor
Geo. L. Whiting
By Attorney

UNITED STATES PATENT OFFICE.

GEORGE LESLIE WHITING, OF WATERBURY, NEBRASKA.

CULTIVATOR.

SPECIFICATION forming part of Letters Patent No. 518,683, dated April 24, 1894.

Application filed November 21, 1893. Serial No. 491,556. (No model.)

*To all whom it may concern:*

Be it known that I, GEORGE LESLIE WHITING, a citizen of the United States, residing at Waterbury, in the county of Dixon and State of Nebraska, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the present invention is to provide an improved cultivator, particularly for corn, which shall admit of the working of three rows, or the cleaning out of two middles, at one trip, and the invention consists of certain details of construction and arrangement, all of which will be fully described and then pointed out in the claims.

Figure 1:
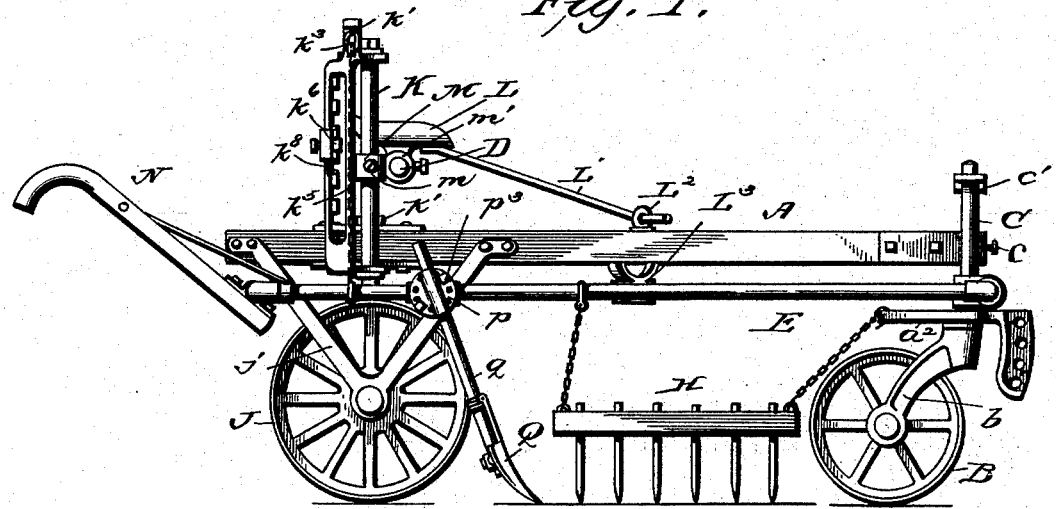
Figure 2:
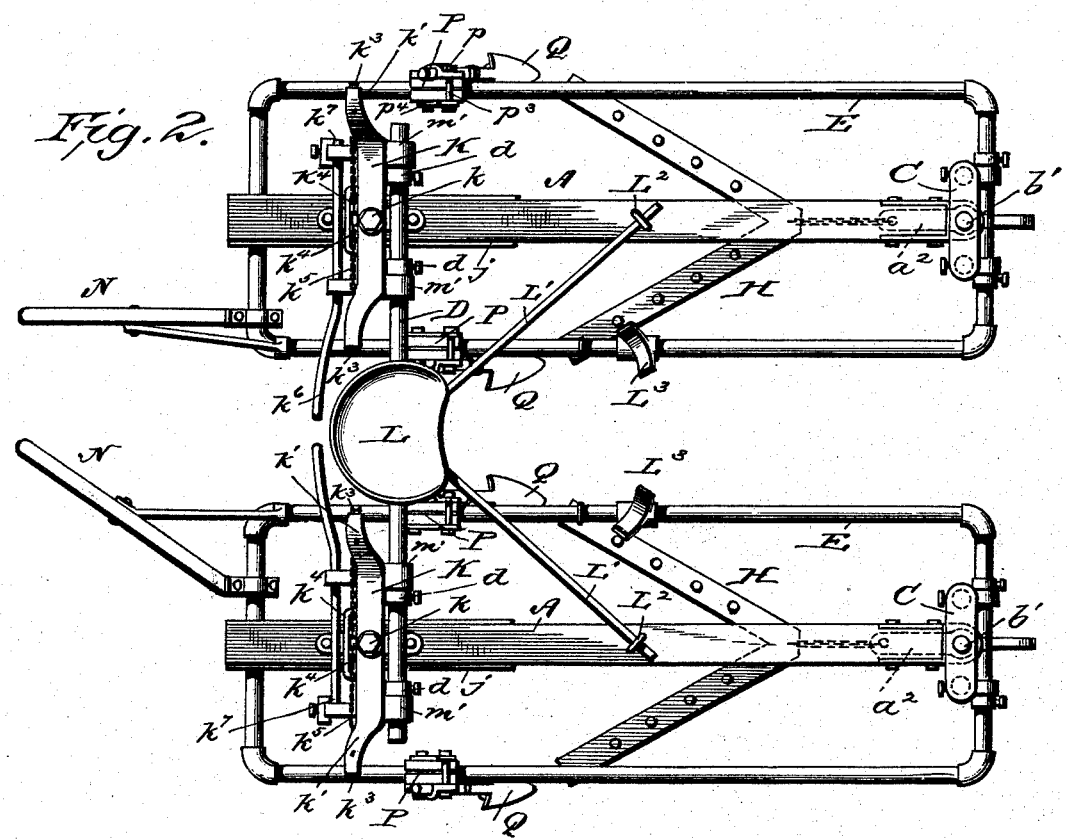

In the accompanying drawings: Figure 1 is a side elevation of a cultivator embodying the features of the present invention and organized as a riding cultivator. Fig. 2 is a plan view of the same. Fig. 3 is a transverse sectional view thereof. Figs. 4, 5 and 6 are detail views showing the attachment of the plows to the plow beam; and Fig. 7 is a plan view of the machine organized as a walking cultivator.

A, A, are a pair of bars, supported at their forward ends by the caster wheels B, B, the spindles or stems, $b'$, $b'$, of the forks, $b$, $b$, carrying said wheels, and on which the wheels swivel, passing up through bearings in the ends of said bars.

C, C, are square frames or clips having bearings in their upper and lower sides for the stems, $b'$, $b'$, of the caster wheels, and lateral bearings near the bottom of their sides for the front cross bar of the open frame plow beams, E, E. The ends of the bars A, A, are supported on the spindles, $b'$, $b'$, within the frames, C, C, and are adjustably fastened thereto by clamp screws, $c$, $c$, or other locking device, and adjustable clamp collars, $c'$, $c'$, on the spindles $b'$ $b'$ just beneath the top members of the frames, C, C, allow for the vertical adjustment of the said frames on the spindles and thereby the regulation of the draft of the plows. Draft bars, $a^2$, $a^2$ are swiveled on the spindles, $b'$, $b'$, each of said bars having a clevis or hitching hook in front for the hitching of a horse, and a hook at its rear end, behind its pivot point, for the attachment of a harrow or drag, H, when the use of the same either with or without the shovels, to be hereinafter described, is desired. The center bars, A, A, extend back to the rear of the cultivator and are each supported at the rear end by bearing wheels, J, J, carried by hangers, $j, j$, pendent from the bars A, A. Immediately above each bearing wheel there is a square open frame or clip, K K, somewhat similar to the forward frames or clips, C, C, before described, through which the respective center bars, A, A, pass and each of which has a center pin, $k$, with a head on its lower end, and passing through a bearing in the bottom and top members of the frame and through a bearing in the center bar, A, the latter passing through the open frame or clip. A collar, $k'$, is keyed or clamped onto the pin, $k$, above each of the bars, A, or the bar itself may be directly keyed or locked to the pin. The frames, K, K, are thus swiveled on the bars, A, A, and firmly supported in a vertical position. On the side members of the open frames, K, there are collars, M, vertically adjustable thereon and having means for locking the same to the frames, as for example set screws, $m, m$, and each collar has a horizontal bearing, $m'$, through which passes a cross bar or yoke, D, the latter passing through the bearings, $m'$, $m'$, of both frames, K, and thus yoking the two gangs of cultivators together. Adjustable clamp collars, $d$ $d$, on the cross bar, D, allow for properly gaging the distance between the two bars, A, A, of the cultivator. Extending out laterally from the top of the frames, K, there are brackets or arms, $k'$, $k'$, carrying pulleys, $k^3$, $k^3$, at their outer ends. A pair of pulleys, $k^4$, are also carried on the top of each frame, K, and chains, $k^5$, $k^5$, attached on either side of the plow beam frame, A, pass up over the pulleys $k^3$, $k^3$, and over the pulleys $k^4$, down to a lever, $k^6$, for the purpose of entirely raising the plow beam, or setting it at any elevation, as desired, to gage the depth of the plowing. The lever arms are attached to the frames, K, as at $k^7$, and pass through a notched slot, $k^8$, which admits of the lever being held in any position. The seat, L, is centrally mounted on the cross bar, D, and has the laterally and forwardly extended arms, L', L', which reach down to the center bars, A, and pass through swiveled eyes, $L^2$, $L^2$, carried by said center bars. These rods or braces steady the seat and preserve its equilibrium and yet permit the two sections of the cultivator to have free swing and play independent of each other, except as connected by the cross bar D. The foot rests carried by the inner member of each plow beam frame, are shown at $L^3$, $L^3$. For use when the cultivator is used as a walking cultivator, as hereinafter described, or otherwise, plow handles are shown at N, N.

It will be understood that shovels or cultivator blades of any pattern may be carried by the plow beam frames, A, A, and the special character of the same is not material, except that the plow beam frame herein described constitutes a simple construction for securing such a disposition of the shovels or cultivator blades as will effect the working of the entire ground between two rows of corn by each gang.

The preferred device for, and method of, attaching the plows to the beam is illustrated by Figs. 4, 5 and 6. The plow beam frame, A, is preferably made of tubing, as combining strength with lightness, and each frame may be a single piece, bent to the proper form, or it may be made of straight lengths connected at the corners with elbows. The round contour of the plow beams allows the shovel standards to be set at any angle thereon. For the adjustable attachment of a shovel thereto there is employed a pair of clamp plates, P, adapted to be applied to the plow beam and flanked on one side, or on both if two shovels are to be carried by one attachment, by a plate, $p$, having a groove or slot, $p'$, in its inner face to receive the shank, $q$, of a shovel or cultivator blade, Q, and a series of bolt holes, $p^2$, adapted to receive bolts, $p^3$, which pass through the outer plate, $p$, and a back plate, $P^4$, and firmly lock the shovel to the beam. As before stated the round contour of the plow beam allows the shovels to be set at any angle thereon, either vertically or oblique, and by means of the series of bolt holes in the plate, $p$, the inclination of the shovel in a vertical plane can be changed. The shovels, disks, or whatever pattern of cultivating blades may be used, may set on either side of each member of the plow beam frame, and are ordinarily set with the forward ones on the inside and the rear ones on the outside, the middle ground being worked by the harrow.

When the cultivator is organized as a walking cultivator, as illustrated by Fig. 7, the center bars, A, A, are omitted, together with the bearing wheels, J, and the parts carried thereby. In front, each plow beam frame has a cross bar, R, or other support for the bearing for the caster wheel, B, and its spindle, $b'$. Above said cross bar, R, and swiveled on the spindle, $b'$, there is a frame or clip, R', similar to the rear frames, K, above described, except that the attachment for raising the plow beam is omitted. The pair of frames, R', R', are also connected by a cross bar or yoke, $R^2$, in the same manner as heretofore described.

At the rear end of each plow beam frame there is a caster wheel, S, to support the plow frames when the cultivator is in transit. The spindles, $s$, of the caster wheels, S, are preferably made vertically adjustable in their bearings, $s'$, so that they can be raised when the cultivator is in use, or they may be entirely removed.

The special advantage of this cultivator, whether it be made for riding or walking, is that each horse works free from the other; if one pulls ahead of the other it does not interfere with the work and the machine is easily handled so as to fully cultivate between three rows of corn.

The adjustable features of the machine, both with respect to the two gangs of cultivators and the shovels on the plow frames admit of the cultivator being set for any width of ground between rows.

Having thus described my invention, what I claim as new is—

1. The combination in a cultivator of a pair of plow beam frames each supported in front by and pivoted on a caster wheel and having a horse attaching device therefor, together with the upright frames having the bearings for the plow beam frames and the vertically adjustable bearings for a connecting bar, with the connecting bar pivotally and adjustably connected to each upright frame, and cultivator blades or devices carried by said plow beam frames, substantially as and for the purpose set forth.

2. The combination in a cultivator of a pair of plow beam frames, each supported in front by and pivoted on a caster wheel and having a horse attaching device therefor, with a central bar for each frame pivoted in front to the caster wheel and carrying near its rear end a supporting wheel, and a connecting bar joining the said central bars near the rear ends thereof and pivotally and adjustably connected therewith, substantially as and for the purpose set forth.

3. The combination in a cultivator of the pair of plow beam frames carrying the cultivator blades, with the center bars for each frame and the supporting wheels at the rear end of said center bars, the forward caster wheel for each frame, with the upright frames having the bearings for the plow beam frames, the caster wheel, and the forward end of the center bar, and the rear upright frames pivoted on the center bars and having the adjustable
5 bearings for the connecting bar, together with the bar connecting the two center bars, substantially as and for the purpose set forth.

In testimony whereof I affix my signature in presence of two witnesses.

GEO. LESLIE WHITING.

Witnesses:
 STORY B. LADD,
 OLIVER W. BAILEY.